United States Patent [19]

Donahey

[11] 3,996,557
[45] Dec. 7, 1976

[54] CHARACTER RECOGNITION SYSTEM AND METHOD

[75] Inventor: Alvin V. Donahey, Worthington, Ohio

[73] Assignee: MI² Corporation, Columbus, Ohio

[22] Filed: Jan. 14, 1975

[21] Appl. No.: 540,798

[52] U.S. Cl. .................................... 340/146.3 SY
[51] Int. Cl.² ........................................ G06K 9/12
[58] Field of Search ....... 340/146.3 AQ, 146.3 AC, 340/146.3 R, 146.3 SY, 146.3 SG; 73/432 R, 432 A; 178/18, 19

[56] References Cited

UNITED STATES PATENTS

| | | | |
|---|---|---|---|
| 3,104,368 | 9/1963 | Steinbuch | 340/146.3 F |
| 3,108,254 | 10/1963 | Dimond | 340/146.3 AQ |
| 3,133,266 | 5/1964 | Frishkopf | 340/146.3 AQ |
| 3,618,019 | 11/1971 | Nemirovsky et al. | 340/146.3 SY |

OTHER PUBLICATIONS

Day et al., "On Line Written Input to Computers," Proceedings of the Conference on Machine Perception of Patterns: Teddington, England, (12–14, Apr. 1972), pp. 233–240.

Wilner, "Dynamic Alphanumeric Hand Printing Recognition System," IBM Tech. Disclosure Bulletin, (vol. 8, No. 9, Feb. 1966), pp. 1205–1207.

Primary Examiner—Leo H. Boudreau
Attorney, Agent, or Firm—Cennamo Kremblas & Foster

[57] ABSTRACT

Apparatus and method for the recognition of hand written alphanumeric characters as they are being formed. The different sequence of strokes for each letter of the alphabet and numbers, as it is written, is codified. The apparatus comprises a minimum number of parallel conductive bars which produce a characteristic signal when crossed or touched with the pen as the alphanumeric character is being formed to reproduce the identifying code. A computer having the distinctive alphanumeric character code stored therein compares the signals derived by contact of the pen with the conductive bars and renders an appropriate readout for utilization. The invention encompasses script writing and word identification as well as the conventional printing of the individual letters.

20 Claims, 11 Drawing Figures

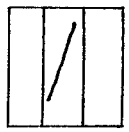 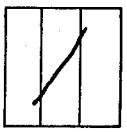 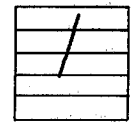
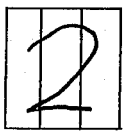 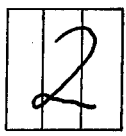 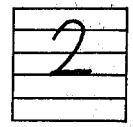
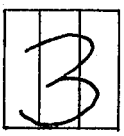 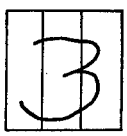 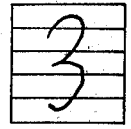
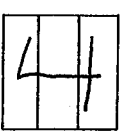 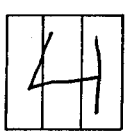 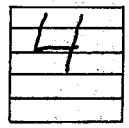
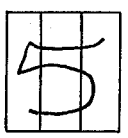 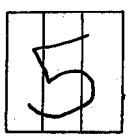 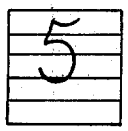
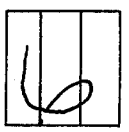 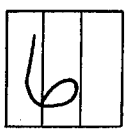 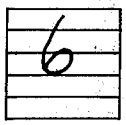
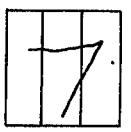  
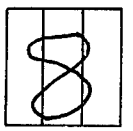 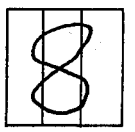 FIG.2 
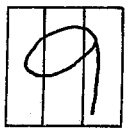 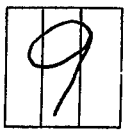 FIG.5 

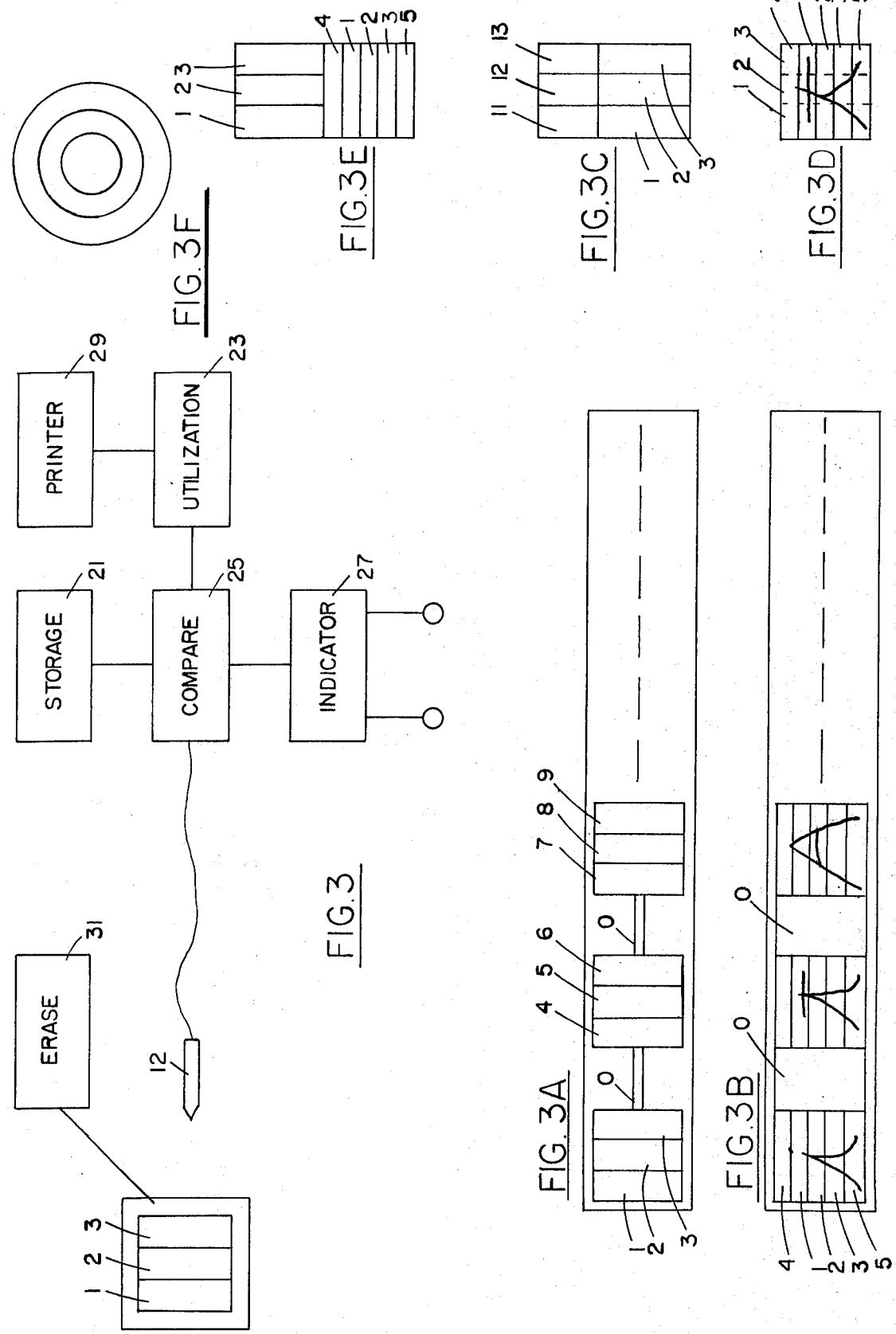

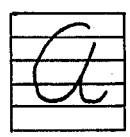 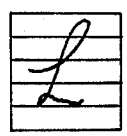 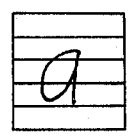 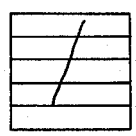 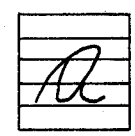 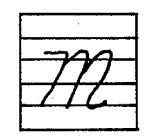
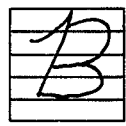 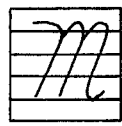 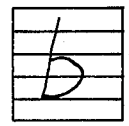  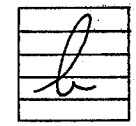 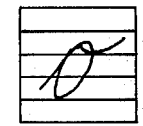
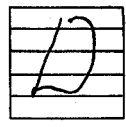 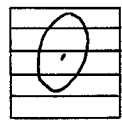  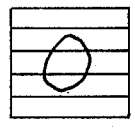 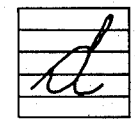 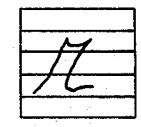
 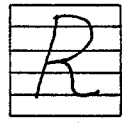  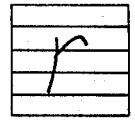 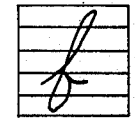 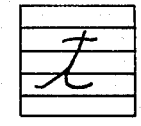
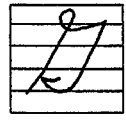    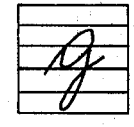 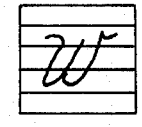
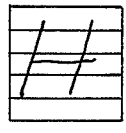 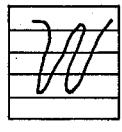 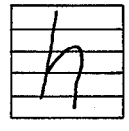 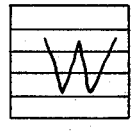 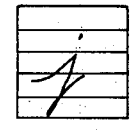 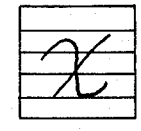
  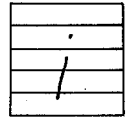 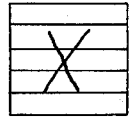 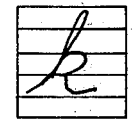 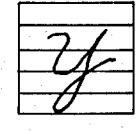
   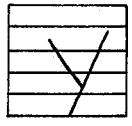 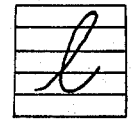 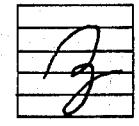
  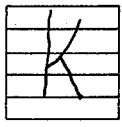 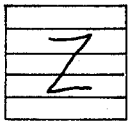
FIG. 4

CHARACTER RECOGNITION SYSTEM AND METHOD

BACKGROUND

The advent of the computer has led to the processing of information in a magnitude that a few years ago was believed to be unrealistic. This is accomplished since once data is entered into the machine the processing is extremely rapid. However, the computer can not perform any more rapidly or accurately than the raw data fed in. Accordingly, character recognition systems to develop the data have been considered and devised.

Character recognition systems find extensive use in business where large amounts of data are received and must be processed. These businesses include, but not limited to, insurance companies, merchandising firms, and passenger transportation. Also in an unrelated way these systems find equal utility in various forms of teaching aids.

The prior art shows alphanumeric character recognition systems that purportedly function to provide an electrical signal representative of the character as it is written by hand. In certain prior art systems the tablet is divided into conductive zones. A pattern results when a number is written in the zone. Other writing tablets utilize the cross coordinate technique to provide an X and Y reading. These systems employ a matrix of one sort or another; that, in actuality, is a grid having a horizontal and vertical component. Again, other prior art shows character recognition systems using pressure, magnetic, piezoelectric, and optical sensors. These prior art systems have significant disadvantages. Notably are those that require accurate positioning of the characters in a particular area to obtain reliable character recognition. Misalignment or misplacement of the character within the particular area will produce erroneous output signals. Some of the systems of the prior art are unable to recognize conventional alphanumeric characters. The characters to be recognized by these systems must be formed in an unconventional manner which, of course, detracts from their legibility by the human eye. Other known prior art systems which recognize characters of conventional configuration have rigid requirements upon the formation of the characters. In these systems, errors will result in the automatic recognition of the characters if the characters do not precisely conform to a predetermined type font. In general any variation in size, shape, and orientation of alphanumeric characters when restricted to be written in a defined area defeats the practicality of such systems.

In every instance the systems of the prior art are not complex and cumbersome; and, strangely, it has been found that the more finite the grid, matrix or mosaic the more unreliable the system.

SUMMARY OF INVENTION

It has been found that the alphanumeric character, when written in the manner as conventionally taught in grammer schools, comprises a sequence of strokes that is different for each character. Also the alphanumeric character when printed, although primarily believed to be written in the vertical mode (whether straight or slant) comprises a sequence of strokes having a strong horizontal component. Accordingly, the present invention in its most general aspect detects the horizontal component of the sequence of strokes unique to each printed or written alphanumeric character.

The obvious approach of detecting - the X and Y components is not utilized. The present invention comprises single coordinate detecting system that is extremely simple in comparison to the prior art. More specifically a minimum number - three in one preferred embodiment - of conducting bars vertically aligned in parallel are utilized. As the writing instrument moves in writing or printing the alphanumeric character it will be brought in contact with different ones of the parallel vertical conductive bars. The sequence of contact with the respective bars is different for each alphanumeric character.

The sequence of strokes as related to the contact with the conductive bars is given a number, i.e., is codified with a sequence of numbers unique to each letter.

The present invention further identifies the particular alphanumeric character in its uniqueness by still another factor. This factor is the movement made when the writing pen is not touching the writing surface - "pen up." In this way the writing strokes with its unique sequence is interspersed in its identifying code with a "pen up" signal.

In the alphanumeric character recognition of script writing it has been found to be more expedient to detect the vertical components. Hence the parallel conducting bars for the recognition of script writing are horizontally aligned. Since script writing does not have a uniform height and depth a conducting bar is added above and below the printing number of conducting bars.

OBJECTS

It is accordingly a principal object of the present invention to provide a new and improved character recognition system that is extremely simple in design but exceptionally reliable and accurate.

A further object is to provide such a character recognition system that does not utilize the conventional X and Y detection with grids, matrixes, or mosaics nor the various forms of pressure detections and their attendant disadvantages.

Another object is to provide such a character recognition system that utilizes the discovery that each alphanumeric character is composed of a different sequence of strokes; and that each character is further distinguished by the sequence of strokes being interspersed with pen up.

Another object is to provide such a character recognition system that codifies the distinctive sequence of strokes of the alphanumeric characters.

Another object is to provide such a character recognition system that includes a minimum amount of apparatus to identify the code for each letter as it is written.

Still another object of the invention is to provide such a character recognition system that includes a minimum amount of apparatus that is responsive to the horizontal components of printed letters and vertical components of script letters as they are written.

Further objects and features of the alphanumeric character recognition system of the present invention will become apparent when reviewed from the detailed disclosure taken in conjunction with the drawings in which:

BRIEF DESCRIPTION OF DRAWINGS

FIG. 2 is illustrative of the numbers as printed with the sequence of strokes indicated by the arrow. The first column is conventional printing whereas the second column is an alternative illustration of printing.

FIG. 3A illustrates a series of writing areas for printing in a tablet; FIG. 3B illustrates a series of writing areas for script in a tablet. FIGS. 3C, D, E, and F are first, second, and third alternative writing areas.

FIG. 3 illustrates in schematic block a preferred embodiment of the invention comprising a three conductive vertical bar recognition circuit for the writing tablet.

FIG. 4 is illustrative of the upper and lower case script and lower case printed alphabet as written with the sequence of strokes indicated by the arrow.

FIG. 5 illustrates the five horizontal conductive bar arrangement for detecting script number writing.

DETAILED DESCRIPTION OF DRAWINGS

Figure 1:
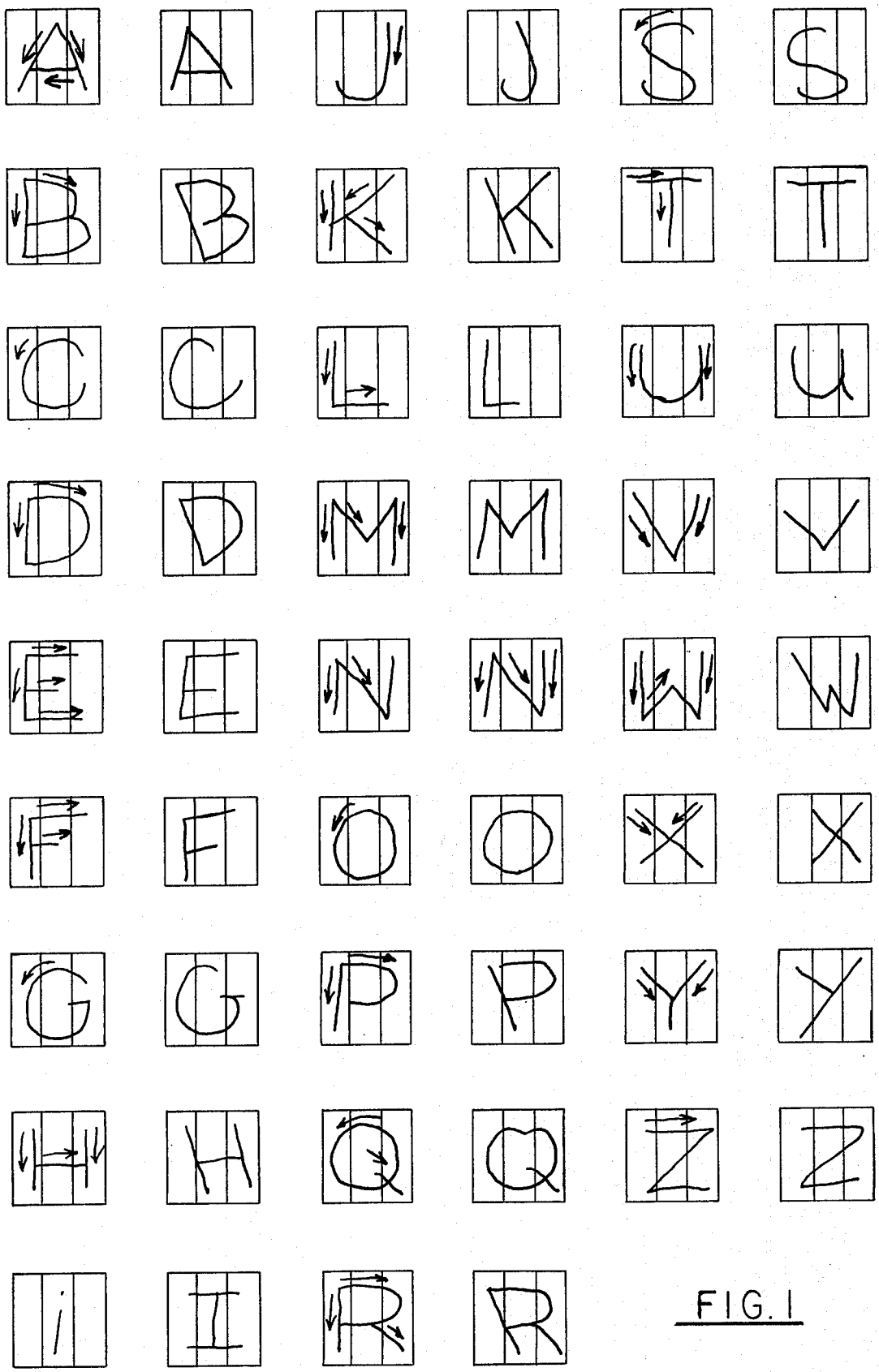
FIG. 1 is illustrative of the upper case alphabet as written with the sequence of strokes indicated by the arrow. The first column is conventional printing whereas the second column is an alternative illustration of printing.

It has been found that an overwhelming majority of persons in the United States were taught - and disciplined - into writing the alphabet in a particular given manner. It has now been discovered that the alphabet as written in this same particular given manner comprises a series of strokes in a sequence that is distinct for each letter written. It is also noted that with alphanumeric letters there is between strokes a period of time when the pen is up from the tablet.

The term "alphanumeric character" is herein used to specifically denote the printed upper and lower case alphabetical letters, arabic numerals, and punctuation. The term "script" is used herein to specifically denote upper and lower case cursive writing, and punctuation. In any instance, however, the invention is not to be limited to nor confined to alphanumeric characters or script and may encompass any symbols or other form of printing and writing. For instance, note Chinese as illustrated by the sequence of strokes in "Read Chinese" by Far Eastern Publications, Yale University, 1953.

With particular reference now to FIG. 1 there is illustrated in column A the upper case alphabet as "normally" written (printed). In column B there is illustrated the upper case alphabet as written in a first alternative manner.

FIG. 2 is illustrative of the numbers as written (printed).

With continued reference to FIG. 1, generally the sequence of strokes of the alphanumeric characters are written with up and down strokes (or slant). However, in writing the alphanumeric character (except the alphabet I and the number 1 depending on how it is written) there is included a horizontal component. Simply the stroke is in two directions. This, of course, immediately suggests that the recognition system comprises detecting the X and Y components. As pointed out above the prior art X and Y systems are bulky, cumbersome, expensive, and the more sophisticated the more unreliable.

It has now been found that if the alphanumeric character is divided into three areas, such as three vertical elongated rectangular areas and the areas are given the consecutive numbers 1, 2, and 3, the sequence of strokes that make up each alphanumeric character may be coded as to the sequence of the areas touched.

Specificially refering to FIG. 1, the alphabet letter A when written comprises a first stroke starting at the upper middle area 2 and extends into the left hand area 1; the next stroke starts at the upper middle area 2 and extends into the right hand area 3; and the last stroke starts in the left hand area 1 crosses the middle area 2 and into the right hand area 3. The alphabet letter A then can be given the code No. 2123123. With continued reference to FIGS. 1 and 2 it follows that the entire alphabet and the ten numbers can be given distinctive coded numbers as follows:

|   | Column A | Column B |
|---|---|---|
| A | 21/23/123 | 1/23/123 |
| B | 1/123212321 | 12/123232 |
| C | 32123 | 32123 |
| D | 1/12321 | 12/1232 |
| E | 1/123/12/123 | 32123/12 |
| F | 1/123/12 | 321/12 |
| G | 32123/23 | 2123/24 |
| H | 1/3/123 | 12/3/23 |
| I | 2/2 | 2/123/123 |
| J | 321 | 232 |
| K | 1/321/23 | 12/32/23 |
| L | 123 | 12 |
| M | 1/3/12/32 | 1/12/32/3 |
| N | 1/123 | 1/123/3 |
| O | 21232 | 23212 |
| P | 1/1232 | 12/232 |
| Q | 21232/23 | 23212/23 |
| R | 1/12321/23 | 12/12323 |
| S | 3212321 | 212321 |
| T | 2/123 | 123/2 |
| U | 123/2 | 123 |
| V | 12/32 | 123 |
| W | 1/21/23/3 | 12/223 |
| X | 321/123 | 0 |
| Y | 12/32/2 | 12/321 |
| Z | 123/321/123 | 1232123 |
| 1 | 2 | 21/23 |
| 2 | 1232/123 | 232123 |
| 3 | 1232321 | 1232/321 |
| 4 | 1/123/3 | 123/3 |
| 5 | 12321/123 | 12321/23 |
| 6 | 12321 | 21231 |
| 7 | 123/321 | 1232 |
| 8 | 321232123 | 212132123 |
| 9 | 32123/3 | 32123 |
| 0 | 21232/321 | 23212/321 |

Between certain of the alphanumeric characters as catalogued above there is a slant(/). This mark represents that the pen has been lifted from the tablet, i.e., pen up. In actuality the pen is lifted and repositioned between strokes. Although the "pen up" is not necessary in the codification it does add another (fourth) factor that further identifies the distinctive coding for those alphanumeric characters.

With continued reference to the code, the designated three parallel areas is sufficient to identify all of the alphanumeric characters. And, since crossing of any area is not limited to once the code can reach an infinite number. Practically speaking the alphabet letter Z contains nine crossings and two pen ups - eleven factors. Taking the parallel combinations each coded area has two possibilities 2 ≅ 2048. It can be seen that a practical number of single characters that can be codified exceed 2048. When plural characters such as in words are combined the code capacity is limited only by the storage capacity of the computer.

It was stated above that the letters and numbers are written in the manner as customarily taught; it is appreciated however, that there are different teachings as well as self discipline. In other words, the alphabet and letters may be written with a different sequence of strokes than those in Column A. One such alternative way is given in Column B. The alternative manner of writing the alphabet in Column B can and is codified in the same manner as the alphabet of Column A. Certain of the alternative code numbers is the same but of significance is that the code numbers that are different are also distinct from all other letters and numbers.

From the above certain very minor exceptions must be taken, the most significant being that the alphabet letter D and P would have the same code number. Simply by not closing the P, such as it becomes distinguishable from the letter D. Therefore the departure from the conventional manner of discipline is most minimal.

Other identifying strokes can be introduced artificially if so desired to increase the numbers making up the code. One such being a 3, 2, 1 slash mark across the alphabet letter O, such as $\phi$ found in computer language.

With reference to FIG. 4 there is illustrated the upper and lower case script, lower case printing. The first column is illustrative of the alphabet as written in the conventional manner - starting as indicated by the arrow. In FIG. 5 there is illustrated the numbers as written in script. In each of the adjacent or second columns the script and printing is in an alternative form. In script writing the vertical components are more predominant, hence the character recognition system of the preferred embodiment departs from the vertical elongated rectangular areas of FIG. 1 to the horizontal elongated rectangular areas as shown in FIG. 4. The alphabet is coded, however, in a manner identical to that of the printed letters of FIG. 1. In script writing - unlike printing - the letters are not of uniform height and depth. In particular, the letters $b, d, f, h, i, j, k, l,$ and $t$ extend above the normal height and the letters $f, j, p, q, y,$ and $z$ extend below the normal depth. To accomodate the increased height and depth of these certain letters a horizontal area 4 is added above the three and another 5 added below the three - now giving five uniform elongated rectangular horizontal areas. The distinctive code given to the script letters as conventionally written is as follows:

| A | 43212321 | a | 3212321 | a | 123212321 |
|---|---|---|---|---|---|
| B | 34321234321 | b | 43215/321 | b | 1234321 |
| C | 343212 | c | 2321 | c | 2321 |
| D | 4321234 | d | 43212321 | d | 12321234321 |
| E | 4321 | e | 12321 | e | 1232121 |
| F | 43212 | f | 34321/2 | f | 123432151 |
| G | 1234321 | g | 32123215 | g | 12321232151 |
| H | 432143212 | h | 4321/3215 | h | 1234321 |
| I | 21234321 | i | 21/3 | i | 121/3 |
| J | 123432151 | j | 215/3 | j | 12151/3 |
| K | 43214321 | k | 4321/4321 | k | 123432121 |
| L | 234321 | l | 4321 | l | 12343212 |
| M | 432123212321 | m | 32123212321 | m | 32123212321 |
| N | 43212321 | n | 3212321 | n | 3212321 |
| O | 4321234/2 | o | 32123 | o | 1232123 |
| P | 4321432 | p | 3215/321 | p | 12321512321 |
| Q | 4321234/21 | q | 32123215 | q | 123212321512 |
| R | 4321234321 | r | 321/3 | r | 12321 |
| S | 34321 | s | 2321 | s | 12323212 |
| T | 44321 | t | 4321/3 | t | 123213 |
| U | 321234321 | u | 32121 | u | 23212321 |
| V | 34321234 | v | 21/321 | v | 123212323 |
| W | 4321234321234 | w | 321232123 | w | 321232123 |
| X | 3432134321 | x | 321/321 | x | 2321321 |
| Y | 4323432151 | y | 321/3215 | y | 3212321512 |
| Z | 43212151 | z | 321 | z | 12321512 |

It is appreciated that script writing is considerably more erratic than printing. Therefore although only minimal departures from the conventional are necessary, care must be taken in writing the script. Two departures are with the letters $s, e,$ and $r$. Each would have the same code number. However, if $e$ and $r$ are written as apostrophe $\epsilon$ and $\gamma$ a distinctive code would result from that of $s$. The tail on $q$ should be curtailed to distinguish from $g$.

With particular reference to FIG. 3 there is illustrated the preferred embodiment in its most simple form. The elongated rectangular areas referred to above is in the preferred embodiment electrically conductive bars 1, 2, and 3. The writing areas 1, 2, 3, alternatively may be optical, magnetic, sound, pressure, mechanical/electrical, or mechanical. The writing instrument is an electrical pen 12. Again the pen 12 may take the form necessary for use with the enumerated alternative writing areas. When pen 12 contacts either one of the bars 1, 2, or 3 a characteristic electrical signal is emitted and fed into the recognition and utilization circuit 25. When writing the alphabet with pen 12 as shown in FIG. 1 the conductive bars 1, 2, and 3 are activated, i.e., crossed in the sequence as given in the code above. Accordingly the characteristic electrical signal identifying bars 1, 2, and 3 is fed into the circuit 23 in a sequence identical to the alphabet's identifying code.

In the recognition circuit further included is a memory bank or storage 21 having stored therein the sequential code numbers of each alphanumeric character. When a character is written the sequence of crossings (characteristic electrical signals) is compared in a comparison circuit 25 with those stored in the memory bank. The number written is recognized, read out by indicator 27, and utilized for instance by the computer for its intended purpose, or the information is printed out by printer 29.

The above description of the preferred embodiment is described with respect to a single alphanumeric character. It is appreciated that the word recognition is more significant than the individual characters. There is shown in FIG. 3A an alternative writing tablet having several writing areas. It has been found that most words comprise ten or less letters, however, any number of writing areas can be provided. In that each writing tablet may be identical the bar crossing sequence of that described above is applicable to each area. It may be desired to include a fourth bar O to indicate the distinction between each character in a word.

Alternatively the three bar writing areas may be numbered 1 through 9 consecutively. In this way the computer will recognize that any code sequence of 1-3, 4-6, and 7-9, would be a different alphanumeric character. In this embodiment the intermediate bar O can be utilized to denote word separation.

The series of conducting bars shown in FIG. 3A is not intended to preclude word writing with the single area of FIG. 3. The alphanumeric letters can be written one over the other with an automatic erase of the previous letter. The erase on the multiple writing areas can be manually initiated by erase circuit 31 without too much of an inconvenience to the operator. Assuming the memory bank has a sufficient capacity word code can be stored and compared instead of letter by letter.

The series of conducting areas for determining script written words appears to be somewhat more essential since there is very little pen up in script writing; and, the characters are joined together. In script writing the additional vertical bar O would be an indication of the separation between characters.

In FIGS. 3C, 3D and 3E there are shown certain alternative embodiments of the writing area to provide the coded sequence of stroke writing. These alternative embodiments are illustrative of the sequence of strokes made upon crossing (contact) with the respective parallel areas. The contact areas - although in each instance parallel to each other, can take various arrangements. Specifically, in FIG. 3E there are a first group of vertical areas positioned adjacent the second group of horizontal areas. The vertical and horizontal areas are operative jointly, or alternatively, they may be switched from one writing area to the other. In FIG. 3D there is a second group of writing areas. The upper grouping is made of box-like parallel areas that are smaller than those of the lower grouping. One particular utility for this upper grouping lies with punctuation recognition.

In FIG. 3D, there is a vertical group of areas having a horizontal group of areas superimposed thereon. With continued reference to this Figure, it is reiterated that the present invention does not utilize X and Y components. In a conventional X and Y system, time is an important factor, whereas with the instant invention, time is not a consideration. In the superimposed writing areas, certain horizontal components are coded and certain vertical components are coded; but, significantly, it is sequential coding. With a given code - even in retrospect - the X and Y components cannot be determined, that is, the instantaneous vertical and horizontal position of the pen when writing a character is not given.

It must be appreciated, however, that although the present invention is not an X and Y system, a conventional X and Y system can be converted into the sequential coding system of the present invention. Simply, a grid pattern can be utilized to give the vertical bar code information and then the horizontal bar code information. It is repeated, to utilize such an X and Y system to give coded sequence of stroke information, time is not a factor.

FIG. 3F illustrates adjacent writing areas that are coaxial. It has been found that with alphanumeric character recognition the parallel contact areas produce more readily the coded sequence. However, in other forms of recognition the coaxial arrangement of contact areas finds utility.

The indicator 27 shown may be a cathode ray tube or L.E.D. display indicating to the operator whether he has fed into the comparison circuit the appropriate characters. A red and green light indicator to indicate a coded match character would be less costly.

The utilization circuit 23 can be fed to a simple print out such as a typewriter 29. In this way hand written words would be simultaneously typewritten.

To facilitate the storage of the codified alphanumeric characters and the comparison with the recognized code, the code for the alphanumeric characters can be divided into groups. The following is a grouping with the primary groups of 1/123, 123, 2123, and 321.

| | | |
|---|---|---|
| 1 | - | 2 |
| i | - | 2/2 |
| N | - | 1/123 |
| F | - | 1/123/12 |
| E | - | 1/123/12/123 |
| P | - | 1/1232 |
| D | - | 1/12321 |
| R | - | 1/12321/23 |
| B | - | 1/123212321 |
| 4 | - | 1/123/3 |
| W | - | 1/21/23/3 |
| L | - | 123 |
| V | - | 12/32 |
| 6 | - | 12321 |
| 5 | - | 12321/123 |
| 2 | - | 1232/123 |
| Y | - | 12/32/2 |
| 3 | - | 1232/321 |
| U | - | 123/3 |
| 7 | - | 123/321 |
| Z | - | 123/321/123 |
| H | - | 1/3/123 |
| M | - | 1/3/12/32 |
| K | - | 1/321/23 |
| T | - | 2/123 |
| A | - | 21/23/123 |
| O | - | 21232 |
| Q | - | 21232/23 |
| 0 | - | 21232/321 |
| J | - | 321 |
| X | - | 321/123 |
| C | - | 32123 |
| G | - | 32123/23 |
| S | - | 3212321 |
| 8 | - | 321232123 |
| 9 | - | 32123/3 |

Other groups can be envisioned. Also the groups per se can be codified for purposes of recognizing initially the group and then the specific letter.

Although there is described above a preferred and specific embodiment it must be understood that departures may be had without departing from the spirit and scope of the invention.

What is claimed is:

1. An alphanumeric character recognition system for analyzing symbols each written in a sequence of strokes comprising:
   means for defining a writing area,
   means to separate said writing area into a minimum number of elongated side-by-side parallel contact areas,
   means for storing for predetermined symbols said sequence of strokes as to the respective side-by-side areas contacted,
   writing means for writing symbols in said writing area,
   said writing means connected to said storing means to feed thereto said sequence of strokes contacting said side-by-side parallel areas when a symbol is being written,
   comparison means for comparing said stored sequence of strokes of said predetermined symbols with said written sequence of strokes,
   and utilization means having the output of said comparison means connected thereto.

2. The system of claim 1 wherein said number of contact areas are parallel vertically elongated side-by-side rectangular areas.

3. The system of claim 1 wherein said number of contact areas are parallel horizontally elongated side-by-side rectangular areas.

4. The system of claim 1 wherein said symbols are in the nature of script and wherein there is an additional rectangular area above and an additional rectangular area below said horizontal parallel areas.

5. The system of claim 1 wherein said sequence of strokes further comprises an indication of discontinuous strokes, and wherein said discontinuities are stored in said storing means as they occur, relative to said sequence of strokes for predetermined symbols.

6. The system of claim 1 wherein said vertical rectangular areas are three in number.

7. The system of claim 1 wherein said horizontal rectangular areas are three in number.

8. The system of claim 1 wherein said elongated side-by-side parallel writing areas further comprise superimposed horizontal rectangular writing areas and vertical rectangular writing areas.

9. The system of claim 8 wherein said vertical writing area comprises three rectangular areas and said horizontal writing area comprises five rectangular areas.

10. The system of claim 1 wherein said elongated side-by-side parallel contact areas are operative together.

11. The system of claim 1 wherein said elongated side-by-side parallel contact areas are switched from one to the other.

12. The system of claim 1 wherein said utilization means includes a print out.

13. The system of claim 1 wherein said comparison means includes an indicator to indicate that symbol in said area.

14. The system of claim 13 wherein said indicator is a visual indicator.

15. The system of claim 13 wherein said indicator is a visual character display.

16. The system of claim 13 wherein said writing area further comprises an erase in the event of an incorrect entry display.

17. The system of claim 1 wherein said writing area comprises a series of writing areas each distinctively separated.

18. The system of claim 17 wherein said series of writing areas are divided in a predetermined manner.

19. The system of claim 1 wherein said stored sequence of strokes for said predetermined symbols further includes grouping the stored information.

20. The system of claim 1 wherein said adjacent areas are electrically conductive bars; said writing means is an electrical pen; said storing means is operative to store said sequence of strokes as distinctive electrical signals; said comparison means is operative to compare said stored signals with the electrical signals from said writing pen; and said utilization means is operative to utilize the recognized symbols.

* * * * *